US012710068B2

(12) United States Patent
Patterson et al.

(10) Patent No.: US 12,710,068 B2
(45) Date of Patent: Aug. 18, 2026

(54) HOLLOW WALL OBJECT MOUNTING DEVICE

(71) Applicants: Frank V. Patterson, Travelers Rest, SC (US); Tracy L. Yoho, New Fairfield, CT (US)

(72) Inventors: Frank V. Patterson, Travelers Rest, SC (US); Tracy L. Yoho, New Fairfield, CT (US)

(73) Assignee: Frank V. Patterson, Travelers Rest, SC (US)

( * ) Notice: Subject to any disclaimer, the term of this patent is extended or adjusted under 35 U.S.C. 154(b) by 415 days.

(21) Appl. No.: 18/420,999

(22) Filed: Jan. 24, 2024

(65) Prior Publication Data

US 2025/0237252 A1 Jul. 24, 2025

(51) Int. Cl.
*F16B 13/14* (2006.01)

(52) U.S. Cl.
CPC .................................. *F16B 13/142* (2013.01)

(58) Field of Classification Search
CPC .................................................... F16B 13/142
See application file for complete search history.

(56) References Cited

U.S. PATENT DOCUMENTS

| | | | |
|---|---|---|---|
| 3,388,631 A | 6/1968 | Viallancourt | |
| 3,389,631 A | 6/1968 | Viallancourt et al. | |
| 4,601,625 A | 7/1986 | Ernst | |
| 4,647,080 A * | 3/1987 | Sandt | B29C 65/542 285/423 |
| 4,865,489 A * | 9/1989 | Stankus | E21D 20/02 405/259.6 |
| 5,653,563 A * | 8/1997 | Ernst | F16B 13/141 411/258 |
| 5,852,854 A * | 12/1998 | Pierrot | B29C 66/12469 24/297 |
| 7,713,013 B2 | 5/2010 | Sedgewick | |
| 7,934,895 B2 | 5/2011 | Ernst | |
| 8,038,375 B2 | 10/2011 | Kohan | |
| 8,404,065 B2 | 3/2013 | Miller | |
| 8,679,168 B2 | 3/2014 | McNamara | |
| 8,870,506 B2 * | 10/2014 | Hensley | E04B 1/6803 52/396.05 |
| 9,068,347 B2 | 6/2015 | Moeller | |

(Continued)

FOREIGN PATENT DOCUMENTS

| | | |
|---|---|---|
| EP | 1724412 B1 | 11/2011 |
| EP | 3532736 | 9/2019 |
| WO | 200238329 A1 | 5/2002 |

*Primary Examiner* — Vishal A Patel
(74) *Attorney, Agent, or Firm* — Blaine Childress; ChemAu, LLC

(57) ABSTRACT

A recessed object mounting device suitable for inserting into a prepared aperture of a hollow wall material, the device including a substantially cylindrical metal insert and a moisture curable adhesive. The metal insert includes a central bore equipped with tapped machine threads, and an external surface adapted with parallel channels to receive and retain an adhesive deposit. The device includes at least one O-ring installed within a distal external surface channel, the O-ring serving to control the location of an adhesive during curing. When pressed into a hollow wall aperture, the device serves as a base for threadably coupling a object mounting screw.

6 Claims, 6 Drawing Sheets

(56) References Cited

U.S. PATENT DOCUMENTS

| | | | | |
|---|---|---|---|---|
| 9,175,692 | B2 * | 11/2015 | Nowitzki | F04D 29/086 |
| 9,549,726 | B2 | 1/2017 | Dreyfuss | |
| 10,900,512 | B2 | 1/2021 | McDuff | |
| 11,110,514 | B2 * | 9/2021 | Kreig | F16B 11/006 |
| 11,692,579 | B2 | 7/2023 | Call | |
| 2004/0071503 | A1 | 4/2004 | Jones | |

* cited by examiner

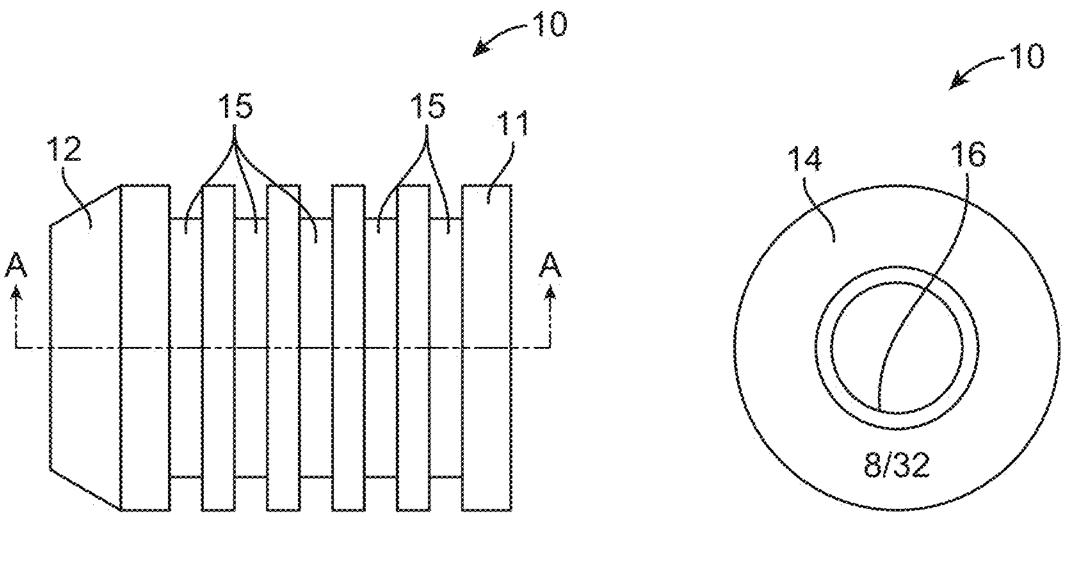
FIG. 3 FIG. 4
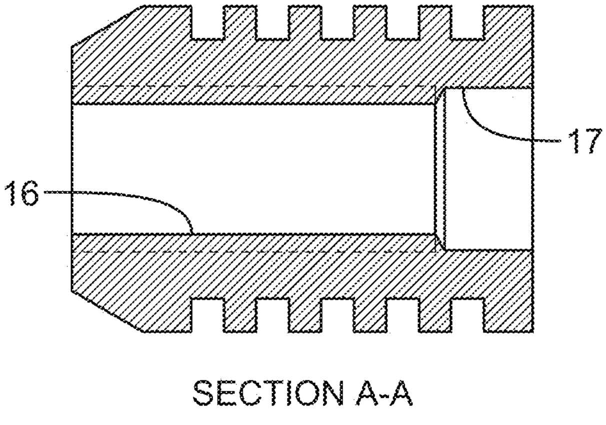
SECTION A-A
FIG. 5

Split Base Wall Anchor

HOLLOW WALL OBJECT MOUNTING DEVICE

FIELD OF THE INVENTION

The present invention relates to an apparatus and a method for mounting objects onto a hollow wall, hollow floor, hollow ceiling outer surface, and supporting structure using an adhesively affixed cylindrical metal insert.

DESCRIPTION OF THE PRIOR ART

Methods of mounting objects onto hollow wall materials, materials such as gypsum board, plywood panel, composite panel, polystyrene panel, or cement board, are known. Prior art methods have employed, for example, devices such as toggle bolts, plastic anchors, or expanding shielded inserts. However, spring loaded folding bi-winged toggles, such as described in U.S. Pat. No. 2,013,503 to Pleister, lack the ability to retain the rear face securing component if one removes the mounting screw when wishing to attach a different object. In such a toggle device, the bi-winged folding head component falls away into the hollow wall cavity. Additionally, the spring toggle bolt device often requires the screw or bolt component to be threaded through the object to be mounted during passage of the toggle through a drilled wall aperture. Thus, in the case of a bi-wing spring toggle bolt, a sizeable or heavy fixture that requires multiple toggle style wall anchors can be quite cumbersome when one wants to properly position multiple spring-loaded devices while aligning heavy objects. Moreover, the U-shaped profile of a typical spring-loaded bi-fold toggle device presents knife-like deformation to the rear surface of a hollow wall material, arising from the concentrated stress exerted by the edges of the toggle metal rails against a material such as gypsum drywall. Such concentrated forces compress or indent the wall material resulting in decreased firmness. To restore the desired firm tension, retightening of the toggle bolt is required to preserve its intended purpose. Progressive deformation creep resulting from serial retightening can lead to failure of the toggle head at its fold hinge or may result in wall board failure. At times, the toggle head wings may severely deform, tear, or even die-cut a friable wall material. In the case of heavy objects such as a mirror, one may select a relatively large toggle in an effort to decrease deformation tendency, however, such larger toggle selection results in exceptionally large wall openings that are difficult to repair when changing the room design.

Expanding screw shield wall anchors, such as split tip plastic screw sleeves, have also enjoyed widespread usage. However, these types of inserts have the disadvantage of degrading the inner surfaces of the wall material, especially gypsum board, when supporting heavy objects or objects that are frequently grasped. Additionally, sleeved screw wall anchors remain embedded in the wall board after removal of a mounting screw, thereby leaving a flange projecting from the wall board outside surface, thereby preventing filling and sanding the surface without extracting the bulging flange. Moreover, practitioners recognize such shielded screw inserts as gradually enlarging the desired wall bore in response to heavy load or cycles of loading and unloading, resulting in the increased downward deflection, or "tipping" of a mounted object. Such repeated loading and unloading may result in catastrophic dislodgement of the shielded screw from drywall due to degraded mineral filled gypsum board. Once such mechanical damage occurs, it is difficult to retroactively secure and realign the insert.

A combination of a toggle bolt and tapered resilient "plug" was described in U.S. Pat. No. 3,389,631 to Vaillancourt wherein the somewhat conical plug is fashioned from yieldable materials such as cork, rubber of plastic, which is deformed into the wall aperture, between a front wall surface washer and the rear wall surface toggle wings.

Of general interest are wall mounting devices such as those described in U.S. Pat. No. 5,190,425 to Wieder et al. or U.S. Pat. No. 7,261,505 to Ernst et al., each incorporated in its entirety by reference thereto.

Therefore, a need exists for hollow wall mounting devices that overcome the deficiencies of prior art methods such as spring-loaded toggles that tend to cut into wall board and which fall away when the mounting bolt is removed, as well as plastic split-tip shielded screw inserts that tend to loosen, dislodge and severely degrade friable gypsum board, or fasteners that include a prominent flange or collar disrupting the wallboard outer surface planarity after removing a mounting screw.

SUMMARY OF THE INVENTION

It is the general object of the present invention to provide a recessed wall mounting device, suitable for mounting objects onto hollow wall materials, such as for example, mirrors, shelves, handrails, marine deck cleats, grab bars, towel bars and other items, without the shortcomings of known prior devices.

Another object of the invention is to provide a self-supporting and recessed device for mounting an object above the front face of a hollow wall material, without the device component protruding beyond the front wall surface. Additionally Such a recessed, or flangeless, mounting device would result in quicker restoration of the wall face when the mounting location is changed.

Another object of the invention is to provide a recessed wall mounting device that may be used in difficult positions wherein the drilled wall aperture encounters a rear surface structural member, such as a wooden vertical or horizontal components. In such applications the drill passes a sheet of drywall, for example a gypsum material that is 12.5 mm to about 15 mm thick, and wherein a wooden "stud" is encountered immediately adjacent to the wall board. The adhesively secured cylindrical metal insert performs well in such difficult locations because the adhesive deposit bonds to both drywall and adjacent wood.

Yet another object of the invention is to provide a recessed securing means equipped with inner bore threads to engage an object mounting screw. Several securing means are contemplated and tested by the inventor and described in greater detail in the embodiments and drawings herein. Securing means include threads tapped directly within the cylindrical insert bore walls.

Still another object of the invention is to adhesively affix a cylindrical metal insert into a drilled aperture. This object is realized by creating a plurality of channels along the external surfaces of the metal insert. The channels serve as a reservoir for depositing a curing adhesive prior to inserting the metal insert into the prepared wall bore. The metal insert outer diameter substantially matches the drilled aperture of the hollow wall material. Once the adhesive has cured, the cylindrical metal insert is ready to accept an object mounting screw within the inner diameter tapped threads of the metal insert.

Another object of the invention is to protect the outer hollow wall surface from contamination from an excess of adhesive. As those having experienced expanding foam adhesives such as polyurethane chemistries know, some of the better known adhesives react with ambient moisture to form a high polymer. When the chemical reaction occurs, foaming exerts pressure along the contacting surfaces. Such expansion of a deposit of adhesive is advantageous because the pressure of the expanding adhesive results in better coverage of the walls of a drilled hollow wall aperture and such expansion pressure may advantageously penetrate friable hollow wall bore surfaces, thereby improving anchoring of the metal insert into the drilled aperture. However, one disadvantage of an expanding curing adhesive is that expansion tends to push adhesive along the entire outer surface of the insert to include spread onto the first and second ends of the cylindrical insert. If expansion of the adhesive extends to the front of the insert, such as in the case of depositing a greater that desired volume of the adhesive, such movement of the expanding adhesive front can result in damage to the front surface of the hollow wall material that is undesirable when redesign of the wall is wanted. This forward thrust by the curing adhesive can be averted by installing an O-ring within the forward most channel. In a similar manner, in vertical mount uses, such as recessed marine deck mounting, or when mounting onto a hollow wall in which both wall surfaces as viewed, an O-ring is advantageously installed within two channels immediately adjacent to both the first and second ends, or within the proximal and distal channels of the cylindrical insert.

Still another object is to provide a kit for recessed mounting of objects onto a hollow wall, the kit including:

(A) a cylindrical metal insert, said insert including an outer diameter, said outer diameter equipped with a plurality of channels adapted to receive and retain an adhesive therein, an inner diameter bore to engage a threaded mounting screw, (B) a curing adhesive for deposit upon the outer diameter surfaces of the metal insert, (C) at least one O-ring to be installed into at least one metal insert channel, and (D) an array of object mounting screws selected to engage the inner bore threads of the cylindrical metal insert.

Components of the kit enable one to deposit onto channels within the outer diameter of the cylindrical insert, an effective measure of an expanding moisture curing adhesive, or an epoxy, so as to affix the metal insert to a pre-drilled hollow wall aperture when pressed into the aperture. The kit provides a means of recessed mounting a metal insert into a wall aperture to later receive and engage an object mounting screw.

In summary, the inventors have combined an object mounting device comprising an insert equipped with inner diameter tapped threads to engage a mounting screw, and an outer diameter channels to receive and retain an adhesive. The recessed wall mounting device eliminates many of the deficiencies of prior art devices, such as loss of firm attachment upon cyclic loading and unloading, loss of mounting device when removing the mounting screw, and damage to friable wall material by prior art device impingement. These and other objects and advantages provided by the present invention are set out within the specification, the drawings, and claims herein.

Definitions

As used herein, the term hollow wall material refers to a variety of construction materials and mounting positions. Hollow wall materials are utilized in a number of construction applications in which the board-like product is attached to load bearing or partition members, but which result in hollow regions between members. Those having ordinary skill in the art recognize that hollow wall materials include gypsum "dry wall," wood panel, composite panel, fiberglass reinforced composite panel, carbon reinforced panel, concrete panel, expanded polystyrene panel, and the like. Gypsum board often refers to a friable center mineral laminated between two outer layers of paper or film. For example, Goboard® is a water resistant, ultra-light tile backing board. The term wall is herein intended to refer to bottom, top or side room positions, and thereby includes ceiling, side walls, and floor applications.

In the present application, the term "substantially cylindrical" refers to a device having an outer diameter, but which includes deviations from a cylinder due to channels machined into the cylinder for the purpose of retaining a deposit of an adhesive prior to pressing the metal insert into a drilled hollow wall aperture. As will be apparent to those having ordinary skill in the art, the number of channels milled into the outer surface of the cylinder range from at least 2 to about 15, such as from about 3 to about 12, or from about 5 to about 10. The number of channels may differ due to width of a given channel and selected tool, but the number may be, for example 10 channels per 25 mm. Preferred cylinder materials include steel, marine grade stainless steel, aluminum, zinc, and titanium, however, those having ordinary skill recognize that other metals and alloys may be used. Additional materials useful in manufacturing the cylindrical insert include engineering grade thermoset composites such as carbon or glass reinforced structural composites and high strength engineering polymers such as PEEK (polyether ether ketone).

As used herein, the term "substantially planar" refers to a surface that is primarily planar, such as the metal insert second surface. Substantially as used herein refers to a parameter which is greater than 70%, such as greater than 80%, such as greater than 85%, such as greater than 90%, such as greater than 95%. In the case of substantially planar, it refers to a surface whose planarity is disrupted by very minor features such as an edge chamfer, etched label, and an inner diameter bore.

As used herein, the term "recessed" refers to a device that resides beneath or behind the front plane of the wall material. The recessed device of the invention does not require any device component that projects beyond the front face of the wall material as with prior art inserts that include a flange to that would prevent an insert from being installed beneath the hollow wall front plane. Those having ordinary skill in the art recognize, however, that certain objects to be mounted using the recessed insert of the invention may introduce a component that could reside beyond the front wall plane when mounted to the insert using a mounting screw. However, the addition of a such a front surface object component, such as a bracket, base, or retention collar, is not required for the device claimed herein.

As used herein, the term "O-ring" refers to an elastomeric ring that engages one of the channels milled into the outer diameter of the substantially cylindrical insert. O-rings suitable for carrying out the instant invention may be procured by vendors such as McMaster-Carr. For example, item 90025K137 is described by McMaster-Carr as an X-profile Buna-N O-ring, which is suitable for use in a square channel embodiment of the inventive metal insert. Another useful McMaster-Carr useful in the invention is McMaster-Carr 945K21 which is described as an oil-resistant Buna-N O-ring, useful when outer surface channels of the cylindrical insert are concave instead of square cut channels. In preferred embodiments, the O-ring is positioned within the channel adjacent to the planar second end of the metal insert. When installed in this manner, the O-ring serves to locate and subsequently restrict a deposit of expanding polyurethane adhesive from advancing forward of the O-ring, thereby preventing contamination of the front wall surface and the internal tapped threads.

In other embodiments, an O-ring is installed within each of the first and last channels. Such dual O-ring configurations confine a deposit of liquid adhesive to the channel volumes between each of the two end channels. In end uses such as marine applications, as when a vertical mount is desired, the O-ring adjacent the insert first frustoconical end contains a measured volume of liquid adhesive during the cure step. Without a second O-ring adjacent to the first end, the liquid may flow downward prior to curing, resulting in incomplete coverage along the whole outer surface of the insert.

BRIEF DESCRIPTION OF THE DRAWINGS

Having thus generally described the nature of the invention, reference will now be made to the accompanying drawings.

FIG. 3 depicts a side view of a substantially cylindrical metal insert with adhesive channels machined along the outer diameter of the cylinder;

FIG. 4 depicts an end view of the second, substantially planar end of metal inserts useful in carrying out the invention;

FIG. 5 is a cut away view the metal insert of FIG. 3

DETAILED DESCRIPTION OF THE INVENTION

Figure 1:
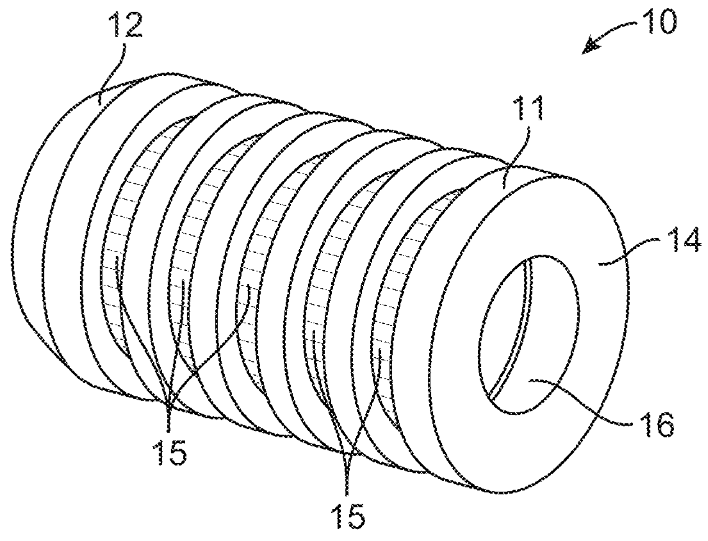
FIG. 1 is a perspective diagram illustrating one possible geometry of the substantially cylindrical metal insert in accordance with an embodiment of the present invention.

The invention includes a self-supporting cylindrical metal insert having a frustoconical adaption to the end of the first end, useful for guiding the insert into the predrilled a hollow wall aperture, circumferential channels along the outer diameter surface but not extending to the first and second ends. Unlike many prior art hollow wall mounting methods, the cylindrical metal hollow wall insert of the invention may be positioned within the hollow wall aperture and adhesively attached, independent of any mounting screw.

It is preferred to restrict the adhesive deposit to the channels of the outer cylinder diameter surface, so as to reduce or prevent adhesive contamination of the hollow object mounting wall material surface. Such prevention of outside wall surface contamination provides easier repair to a drilled wall aperture when re-decorating. Characteristics of useful adhesives include room temperature cure, thixotropy, sag resistance, low clamp time or rapid curing, and gap filling. Applicable polymeric materials include two-part epoxy, hot melt adhesives such as EVA, silyl modified polymer (SMP), polyurethane, polyacrylate, pressure sensitive adhesives, co-polyamides, and emulsion polymer isocyanates.

Adhesives useful in carrying out the present invention include glues, epoxies, and cements, intended for bonding metal to wood, or to paper, such as certain construction adhesives. Preferable adhesives include epoxies, acrylic adhesives, and self-curing adhesives. Adhesion to metal, rapid high shear force bonding, adhesion to low surface energy materials and vibration control are desirable properties for the adhesive. Self-curing adhesives include polyurethane adhesives which react to increase viscosity in the presence of ambient moisture. Preferred curing adhesives reach useful set viscosity within 30 minutes to one hour, such as about 45 minutes after deposit. Preferable adhesives include chemistries that expand during curing to improve bonding by filling void spaces between the wall bore and the outer surface of the cylindrical metal insert.

Adhesive sources include Bostik, Franklin Adhesives and Polymers, Titebond, the Gorilla Glue Company, Loctite, TMI Products (Stick Fast™), Mercury Adhesives, Satellite City Adhesives, and Master Bond Inc. Specific reactive adhesive examples include, Titebond Polyurethane Liquid Glue, Vibra-Tite 224 High Impact Structural Adhesive, Bostik Supergrip® 1582-082, Bostik Born2Bond™ Flex, Bostik Grip-N-Grab™, Bostik Pro-Cure™ Moisture-Cure Urethane Adhesive, Gorilla Construction Adhesive, and PPG Liquid Nails FUZE*IT® All Surface Construction Adhesive (LN-2000). One useful adhesive is a polymeric moisture reactive product such as a self-curing adhesive that is available from the Gorilla Glue Company, Cincinnati, Ohio.

Object mounting means are incorporated within the bore of the metal cylinder. The substantially cylindrical metal insert is equipped with a central bore that is tapped with machine threads to receive and engage a threaded mounting screw. The size of internal thread is preferably etched onto the second substantially planar surface of the metal insert for the convenience of the user.

The process for mounting an object onto a hollow wall material includes depositing an adhesive along portions of the outer surface of cylindrical metal insert having channels machined into that surface, for the purpose of receiving and retaining an adhesive deposit. Once an adhesive, such as a moisture curing adhesive, is carefully deposited along said channels, the mounting device may be pressed through a prepared wall aperture with the first frustoconical end facing inward, until the second planar end is embedded just below the front plane of the hollow wall material. The process of installing the metal insert into the aperture may be facilitated by partially threading a bolt or mounting screw into the internal threads during the adhesive deposition and subsequent wall aperture insertion. This technique permits an engaged bolt, threaded rod, or mounting screw to function as a convenient handle until later removed once the adhesive has cured.

In certain preferred embodiments, an elastomeric O-ring is positioned within a channel closest to the second planar end in order to restrict expanding adhesive from spreading beyond the O-ring, thereby protecting the hollow wall front surface from being contaminated during insertion or adhesive expansion during curing. In other embodiments, such as marine floor or wall applications, an O-ring is installed within two outer most channels so as to reduce spread of a liquid adhesive between O-ring positions. In vertical uses, the second O-ring prevents drip loss of liquid adhesive prior to expansion and curing.

As described herein, the invention provides a method of mounting an object onto the front face of a hollow wall, the method comprising the steps of:

a) locating or drilling an aperture into a hollow wall,
b) selecting a cylindrical metal insert equipped with central mounting threads, the metal insert having an outer diameter matching the hollow wall aperture diameter, and having a plurality of channels machined into the outer surface of the cylindrical metal insert,
c) depositing an adhesive upon the channels machined into the outer surface of the metal insert to provide an adhesive loaded metal insert,
d) inserting the adhesive loaded metal insert into the hollow wall aperture, until the second planar end is positioned beneath the front plane of the hollow wall material,
e) providing sufficient time for the deposit of adhesive to cure, thereby providing a hollow wall mounting device; and
f) inserting a mounting screw into the hollow wall mounting device central bore tapped threads so as provide an object mounting device on a hollow wall front surface.
g) The method of mounting an object, further comprising before step c), installing at least one elastomeric O-ring into the outer surface channel adjacent into the first and second ends of the cylindrical metal insert.

The method may optionally include inserting an end threaded rod or bolt into the central bore threads to serve as a convenient grasping tool during insertion into the wall aperture. This grasping tool may both protect the internal threads of the cylinder from accidental adhesive exposure and prevent any adhesive from contacting the hands of the user.

Example 1

A section of 12.7 mm (½ inch) diameter 12L14 low carbon steel rod, such as a 16 foot long piece, is loaded onto an automated CNC lathe, and advanced into position. A 18-20 mm deep axial counter bore is created, the proximal bore measuring 4.2 mm diameter X 6.0 mm deep and the distal measuring about 3.45 mm in diameter. An 8-32" thread is tapped within the 3.45 mm ID. The exterior surface of the rod is thereafter modified using a grooving tool, such as a single Tungaloy-NTK America, Inc. tool insert, to create a plurality of 1.3 mm wide×1.3 mm deep circumferential channels beginning about 1.3 mm from the proximal end of the rod. In this example, 5 channels are machined into the bored rod. The identity of the internal thread pattern is engraved onto the proximal face of the part using methods such as a laser. A 30 degree chamfer is then created on the distal end and the part is parted from the rod stock to result in a 17.8 mm long insert having a first frustoconical end, for easy wall insertion, and a substantially planar second end equipped with an engraved thread indicator. The steel rod stock is then advanced in the CNC lathe to begin a second metal insert. The resulting metal insert is then cleaned and plated with electroless nickel for corrosion protection.

Figure 2:
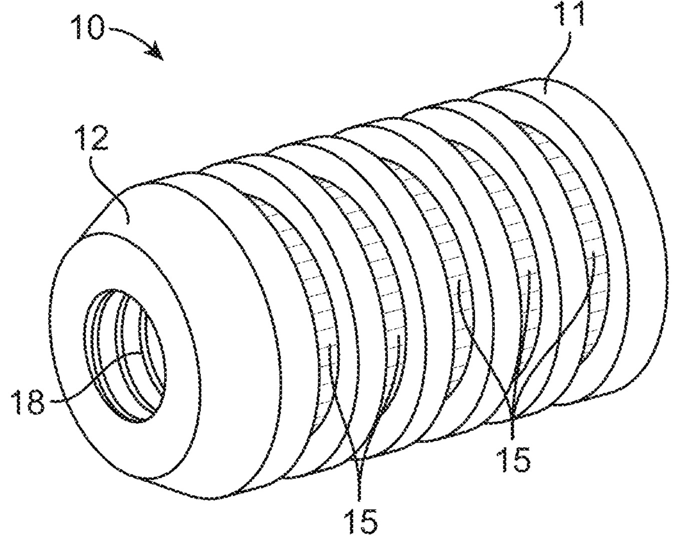
FIG. 2 illustrates a second view of one possible geometry of the substantially cylindrical metal insert in accordance with an embodiment of the present invention, rotated to reveal the frustoconical first end of a metal insert in accordance with the invention, as well as a view that depicts the inner diameter threads for securing an object mounting screw.

Referring to FIGS. 1 and 2 of the drawings, the hollow wall mounting device of Example 1 is depicted in perspective as insert 10 in two rotated views. Insert 10 includes a first frustoconical end 12, a second substantially planar end 14, an outer diameter 11, a central bore 16, a plurality of machined channels 15, milled into the outer diameter surface, and inner threads 18, tapped into the central bore 16. Referring again to FIG. 1 and FIG. 2, channels 15 serve as reservoirs to house a deposit of a curing adhesive prior to pressing metal insert 10 into a drilled hollow wall aperture. A deposit would be restricted to the channel recesses such that the adhesive deposit would not contaminate first end 12, second end 14, and inner bore threads 18 of insert 10. The adhesive to be deposited within channels 15 is preferably an expanding moisture curing adhesive, such as offered by the Gorilla Glue Company, owing to its ability to expand, and thereafter infiltrate the pores of a hollow wall material such as dry wall during the process of water reactive cure.

FIG. 3 depicts a side view of insert 10 with adhesive reservoir channels 15 milled into the outer diameter 11 of the substantially cylindrical metal insert. FIG. 4 is an end on view showing second end 14, labelled with inner bore thread size and inner bore 16.

FIG. 5 is a cutaway view through plane A-A of FIG. 3. In FIG. 5 one may view another embodiment of the invention including an optional counter bore engineered to receive the head of a mounting screw such that it may reside beneath the surface of end 14 in some applications. Inner bore threads 18 are suggested by the broken line.

Example 2

Figure 6:
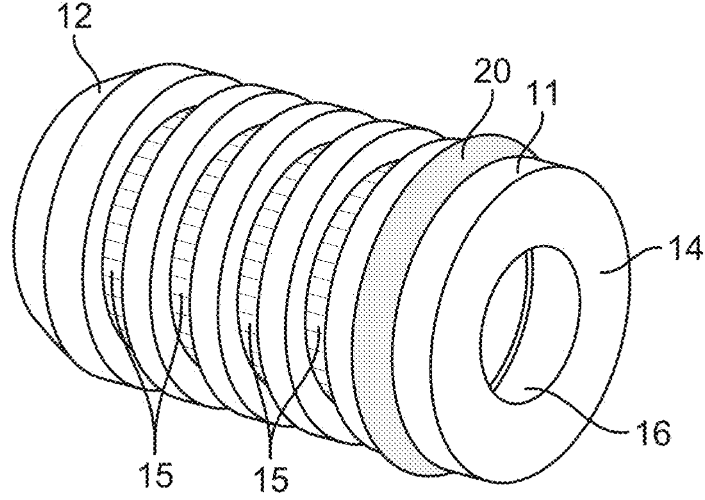
FIG. 6 is a perspective view of cylindrical that is equipped with at least one O-ring adjacent to the substantially planar second end of the cylindrical metal insert, to retain adhesive behind the O-ring position.
Figure 7:
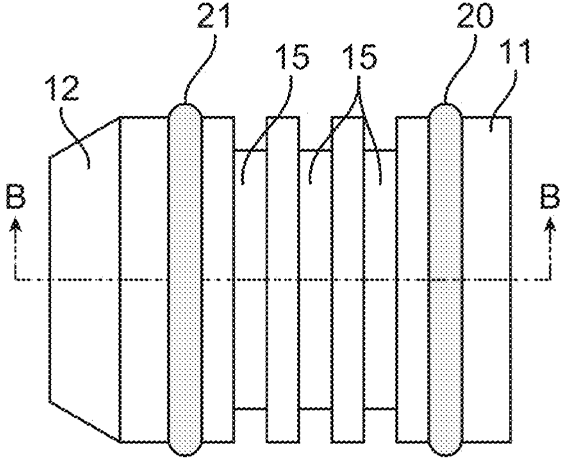
FIG. 7 depicts a side view of a substantially cylindrical metal insert illustrating the O-ring mounted adjacent to the second planar surface as well as the frustoconical geometry of the first end of the metal insert.
Figure 8:
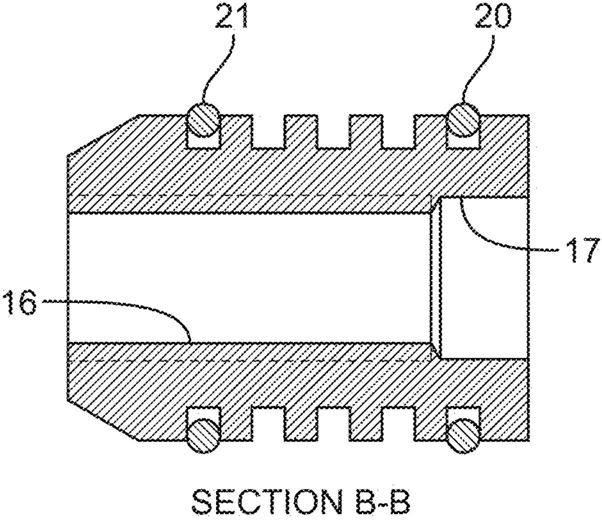
FIG. 8 depicts a cut away view of FIG. 7 along plane B-B, revealing the inner bore, the counter sunk second end opening, and an O-ring to restrict a deposit of adhesive from expanding forward of the O-ring location.

Example 2 illustrates another embodiment in accordance with the invention. Referring to FIG. 6, an insert manufactured in a manner similar to Example 1 is shown having a plurality of outer diameter channels, but in Example 2, a silicone or butyl rubber O-ring is installed within the channel adjacent to the second end 14. O-ring 20 provides a physical barrier to restrict or preferably to prevent, an adhesive deposit within the remaining channels from contaminating surfaces of second end 14, or inner bore threads, inner counter bore, or once installed, the hollow wall surface on which an object is to be mounted. Similarly, FIG. 7 depicts a side view of an embodiment having a protective O-ring 20 installed into a channel adjacent to the second end of the metal insert, and O-ring 21 installed within the channel immediately adjacent to the first frustoconical end. FIG. 8 shows a cutaway view of FIG. 7 through plane B-B and installed O-rings 20 and 21.

Example 3

Figure 9:
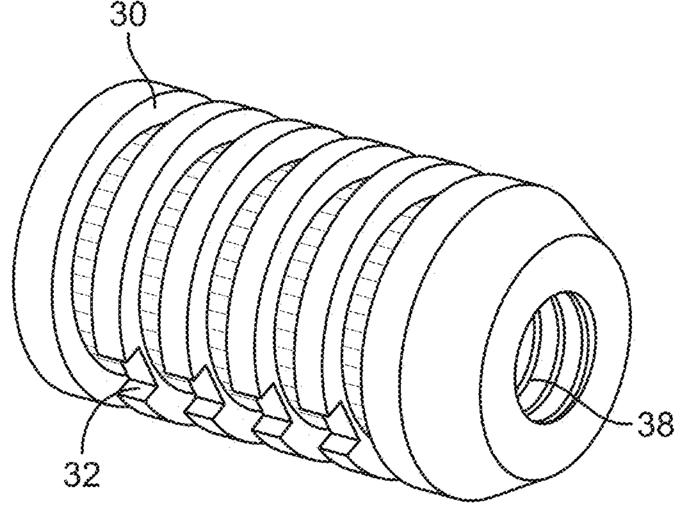
FIG. 9 depicts a cylindrical metal insert according to one embodiment of the invention, with a longitudinal channel connecting circumferential adhesive channels along the outer diameter of the metal insert device.

Example 3 depicts another embodiment of the inventive metal insert. Referring now to FIG. 9, the metal insert includes at least one longitudinal channel 32 along the surface of the outer diameter, which serve to join the plurality of circumferential channels 30. The longitudinal channel serves to assist the flow of an adhesive deposit, particularly an expanding water reactive adhesive, such that the adhesive may more evenly spread along the adhesive reservoir circumferential channels 30.

Example 4

Figure 10:
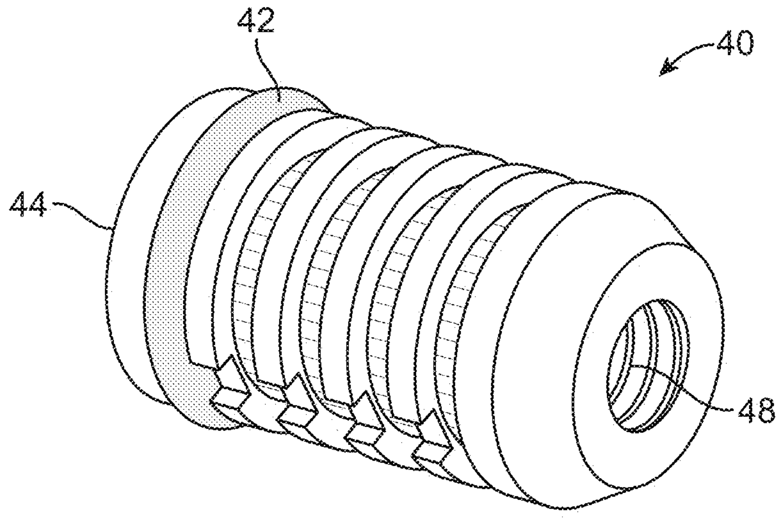
FIG. 10 depicts a modification of the longitudinal channel depicted in FIG. 9, with an O-ring to restrict adhesive from advancing forward of the O-ring installation.

Referring to FIG. 10, the perspective drawing depicts another embodiment of the invention, wherein an O-ring 42 is installed into the penultimate circumferential channel adjacent to second end 44 of metal insert 40. The combination of longitudinal channel 32 with O-ring 42 provided excellent distribution of an expanding water curable adhesive deposit within the circumferential channels while also reducing or preventing the flow of adhesive beyond the O-ring, such that excess adhesive deposit instead impregnates wall board pores and flows toward the first frustoconical end of insert 40. Flow of an expanding adhesive tends to "mushroom" and thus more firmly anchor an insert according to the examples to the rear face of a hollow wall material.

Example 5

Referring to U.S. Pat. No. 2,013,503, herein incorporated in its entirety by reference thereto, a prior art toggle is shown in side view, holding mounted object 21 through hollow wall aperture 16. This toggle bolt object mounting device of this comparative example includes the disadvantages of rear securing wings 50, 51 falling away behind the hollow wall when removing threaded bolt 6 from nut 8 if exchanging object 21, thereby precluding reuse of the assembly. The referenced US patent has the additional disadvantage of utilizing folding U-shaped wings 50, 51 that present knife-like edges to a wall material. Such high pound per square inch contact pressure is prone to compressing or cutting into the paper skin of a material such as drywall.

Example 6

Figure 11:
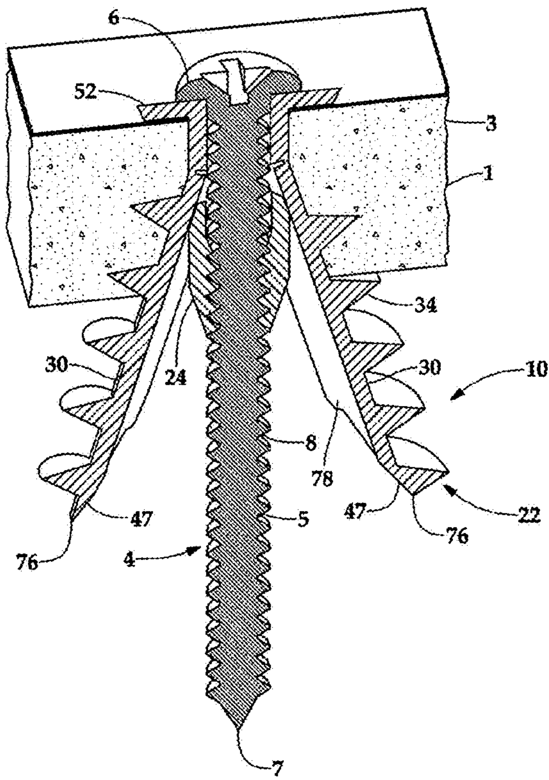
FIG. 11 depicts a prior art plastic wall insert that employs a split tip which expands when a screw is introduced to provide compressive bonding to a wall aperture.

FIG. 11 is a schematic view of a prior art split plastic shield insert and mounting screw inserted in a drilled the hole in a wall board. In this comparative example, FIG. 11 depicts a prior art conical shielded screw wall insert 10. In this comparative example, conical shield 10 is fully inserted into the wall opening. Mounting screw 4 is twisted into insert 10 to frictionally engage and expand the wall insert into two sections. Flange 52 remains above front wall surface to limit depth into the drilled wall aperture. In this comparative example, removal of mounting screw 4 for decorative modifications requires extraction of wall anchor 10 since flange 52 disrupts the front wall planarity. This prior art design represents an un-recessed type of device whose saw tooth projections 34, will damage and ultimately may weaken the strength of a mounted object when installed in gypsum dry wall.

Having described the invention through drawings and examples, it should be recognized that modifications and variations to exemplar embodiments herein disclosed will be understood by those having skill in the art. Specific examples are illustrative rather than representing any limitations or the invention. The scope of the present invention is limited only by the appended claims.

We claim:

1. A recessed hollow wall mounting device, suitable for affixing objects to a hollow wall material through a pre-drilled aperture, the device comprising:
- a cylindrical metal insert, the insert having:
- a frustoconical first end,
- a substantially planar second end,
- a central bore extending the full length of the metal insert, said central bore having an inner bore wall and defining an inner diameter,
- an outer diameter,
- a plurality of circumferential channels disposed along the outer diameter surface and between said first and second ends, but not extending to said first and second ends, said plurality of channels defining reservoirs to receive and retain an adhesive deposited therein,
- an elastomeric O-ring installed within the channel adjacent to said substantially planar second end;
- an elastomeric O-ring installed within the channel adjacent to said frustoconical first end; and
- curable adhesive deposited along said cylindrical metal insert outer diameter surface channels, prior to pressing said insert into a recessed position within said pre-drilled hollow aperture;
- wherein said insert central bore wall is equipped with machine threads tapped along the central bore wall to engage an object mounting screw;
- wherein said substantially planar end resides beneath a front plane of the hollow wall material or resides flush with the front plane of the hollow wall material;
- wherein said cylindrical metal insert outer diameter is selected to match the pre-drilled aperture; and
- wherein said deposited adhesive infiltrates pores of the pre-drilled aperture of the hollow wall material.

2. The hollow wall mounting device according to claim 1, further comprising at least one longitudinal channel disposed along the outer diameter surface and between said first and second ends but not extending to meet said first and second ends, said longitudinal channel thereby communicating with said plurality of circumferential channels.

3. The wall mounting device according to claim 1, wherein said cylindrical metal insert outer surface channels comprise square ended grooves.

4. The wall mounting device according to claim 1, wherein said curable adhesive comprises: an epoxy, a water curable polyurethane, and UV curable acrylate.

5. The wall mounting device according to claim 1, wherein said curable adhesive comprises an expanding water curable polyurethane.

6. The wall mounting device according to claim 1, wherein the insert exhibits an outer diameter of about 12.7 millimeters and wherein said pre-drilled aperture measures about 12.7 millimeters in diameter.

* * * * *